Feb. 22, 1944.  G. A. HUGHES  2,342,144
WELDING GUN
Filed March 29, 1943  2 Sheets-Sheet 1
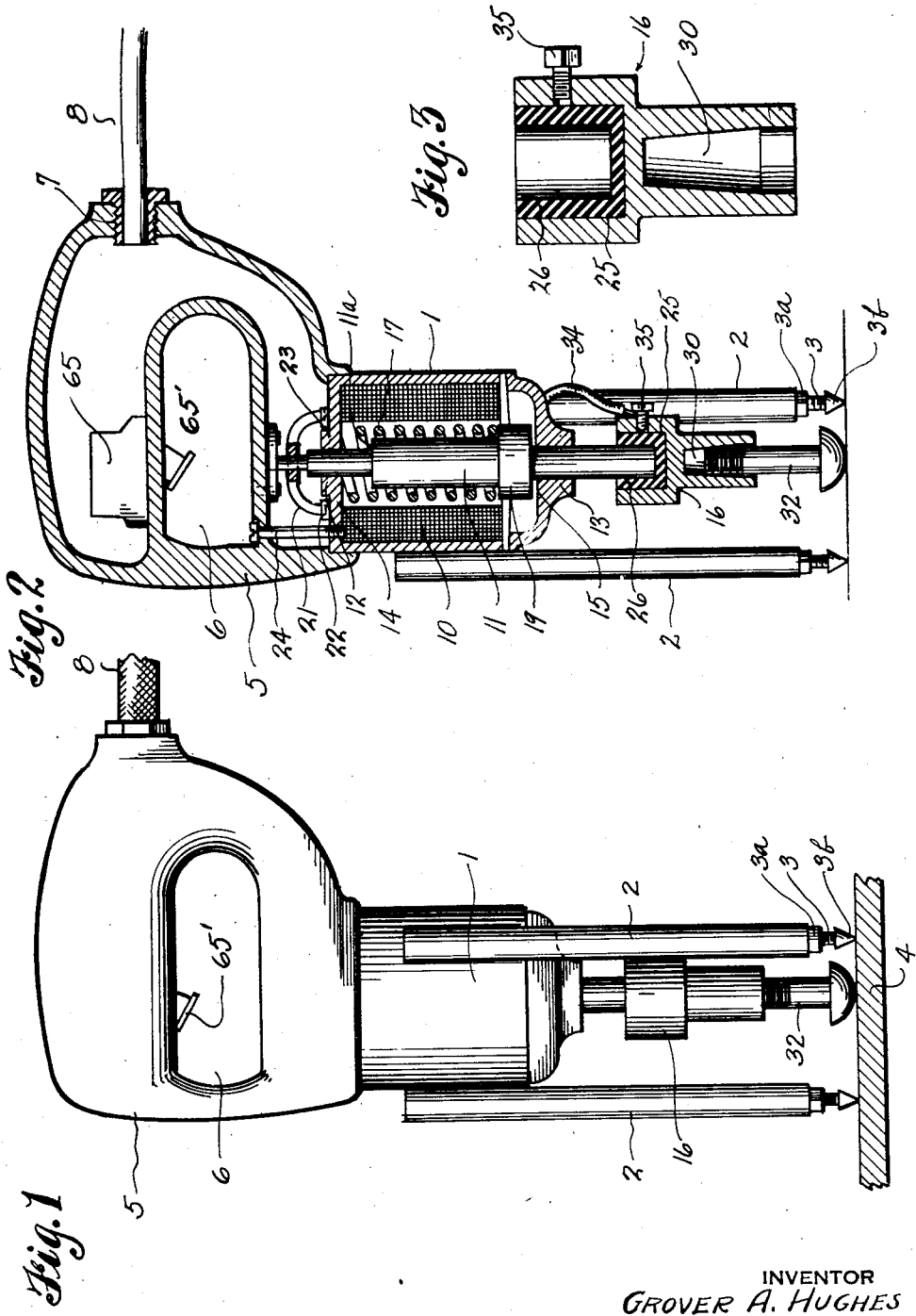
INVENTOR
GROVER A. HUGHES
BY
Cook & Robinson ATTORNEYS Feb. 22, 1944.  G. A. HUGHES  2,342,144
WELDING GUN
Filed March 29, 1943  2 Sheets-Sheet 2

INVENTOR
GROVER A. HUGHES
BY
Cook & Robinson ATTORNEYS

Patented Feb. 22, 1944

2,342,144

UNITED STATES PATENT OFFICE 2,342,144

WELDING GUN

Grover A. Hughes, Seattle Wash., assignor of one-third to Robert W. Hughes and one-third to Roger G. Hughes, both of Seattle, Wash.

Application March 29, 1943, Serial No. 480,938

14 Claims. (Cl. 219—4)

This invention relates to the art of arc welding, and it has reference more particularly to improvements in those devices commonly referred to as "welding guns" for the arc welding of studs, bolts and the like, to steel members, for example, devices or guns designed for the end welding of bolts or studs to a deck plate, hull plate, or bulkhead of a steel ship, or to any of various members of a steel structure which might be comprised within a building or bridge. This invention might be considered to be in the nature of an improvement upon welding guns as disclosed and illustrated in U. S. Patents Nos. 2,256,480 and 2,265,169.

To impart a better understanding of the objects and uses of the present invention, it will here be explained that the arc welding of studs, bolts and the like, to metal plates, calls for applying electric current to a circuit in which the stud and plate are connected; the current being of such character and so applied as to cause an arc to be established between the end of the stud and the plate, from which the stud is initially held spaced, and the metal of these parts on which the arc roots itself, to be melted. Then, after an exact, predetermined time interval, the molten parts are brought together, and immediately after, the flow of current supplying the arc is stopped. The establishing of the welding arc and its timing are very important items in this type of welding operation.

One of the methods heretofore used for the establishing of the arc in a welding operation employing a gun of the type to which the present invention applies, has been, first to apply a stud to the holder of the welding gun, then to bring the legs of the gun against the plate to which the stud is to be welded; it being understood that the end of the stud will then be held by the gun at an exact, predetermined distance from the piece or plate to which it is to be welded. Then a high voltage current, of high frequency, is superimposed on the stud welding circuit which connects with the stud and plate, thus causing a spark to jump between the stud end and the plate that will ionize a path along which the welding current will flow, thus establishing the welding arc.

In another method employed, the stud is so held by the gun that it is initially pressed tightly against the plate. Then the welding circuit is established through the stud and plate. With the current flowing, the stud is lifted slightly from the plate to establish the welding arc; this being accomplished through means embodied in the gun and under control of an automatic timing device. However, during the interval between the instant of applying the welding current and the lifting of the stud, the welding current generator is short circuited through the stud and a maximum current flows. It frequently happens in such instances that the contact between the stud and the work is poor, and the inrush of current heats the stud and work to a point of fusion. Then, owing to the large volume or mass of work, the molten metal will quickly solidify and the stud becomes stuck to the work, and when the automatic means operates for the purpose of lifting the stud to establish the welding arc, the stud is withdrawn from the stud holder instead of being lifted from the plate, causing arcing and burning between these parts with material damage to both. Such damage causes increased welding costs, as well as delay in the work and decrease in the number of studs that can be applied within a specified time. If this condition of sticking is to be overcome, as sometimes is done, by grinding, chipping or cleaning the parts where the stud weld is to be made, this precaution will cause increase in the cost of welding accordingly.

A solution for overcoming the above mentioned stud sticking might be to make the lifting device stronger and heavier and to increase the holding efficiency of the stud holder so that it will always cause the stud to be pulled free from the plate regardless of the premature welding. But this solution is impractical, as such would generally result in damage to the threads of the bolt or stud, and any increase in weight in the welding gun, to make it stronger or heavier, is undesirable because of added difficulty in handling the gun; this being especially true where overhead or side wall welding operations are concerned.

The "sticking" of the stud as above explained, causes poor welding even when the lifting device is able to lift the stud free, because the predetermined arcing interval as regulated by the automatic timing device, will not be constant. Application of the welding arc is based upon a predetermined time interval regulated by a timing device that is incorporated with the gun equipment, and any sticking of the stud modifies this time interval and thus interferes with welding efficiency.

In view of the foregoing explanatory matter, the principal objects of the present invention have been:

First, to provide improvements in the design and arrangement of parts of the welding gun that permits a reduction in its size and weight without any loss of efficiency for i's intended use Second, to provide an improved form of stud holder that will insure lifting the stud, regardless of any tendency of its sticking or freezing to the plate, thus to insure a constant and exact time interval for the welding arc, and eliminate burning between the stud and holder and damage resultant thereto.

Third, to provide a novel arrangement of control circuits.

Fourth, to provide a novel method of establishing a welding arc by first establishing a "pilot arc" to ionize the air along the arc path, thus to eliminate the objectionable features of large inrush of current by short circuiting the welding generator or transformer through the stud, and securing accurate timing of the arcing period.

Still further objects of the invention reside in the details of construction of parts, in their combination, and in their mode of operation, as will hereinafter be fully described.

In accomplishing these and other objects of the invention, I have provided the improved details of construction, the preferred forms of which are illustrated in the accompanying drawings, wherein—

Fig. 1 is a side view of the present welding gun.

Fig. 2 is a longitudinal, sectional view of the same.

Fig. 3 is an enlarged sectional view of the improved stud holder.

Figure 4:
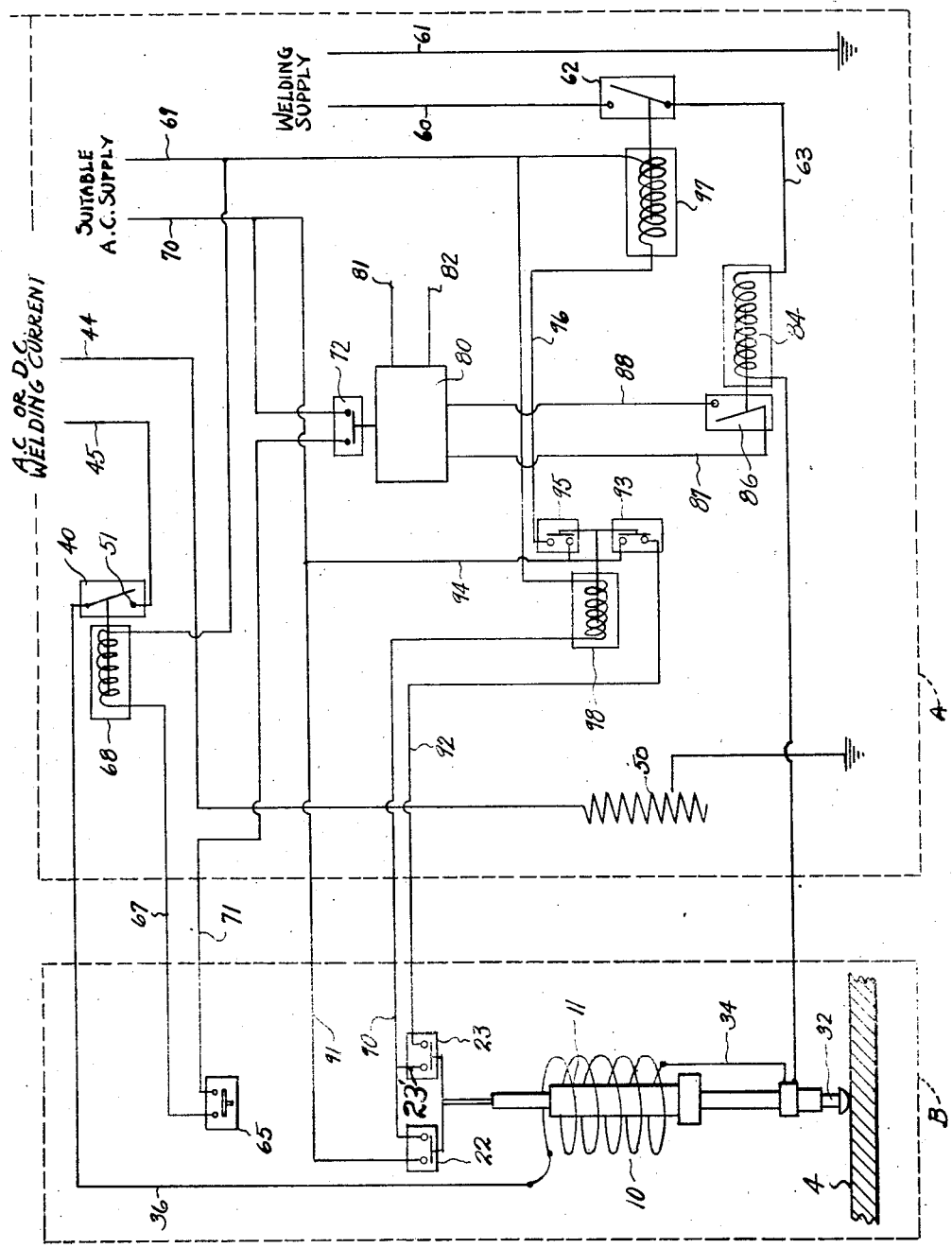
Fig. 4 is a schematic wiring diagram of the various circuits as connected with the control devices employed in connection with the present gun.

Referring more in detail to the drawings—

It is to be understood that the present gun is of such character that it may be manually handled by one person, and that there are various control devices and circuits in connection with the gun that are not embodied in the gun as a part thereof, but are electrically connected with the gun and operate under the control of a switch that is directly associated with the gun for manipulation by the gun operator. In the schematic diagram of Fig. 4, those parts enclosed within the rectangle A are the current control devices and circuit connections not embodied in the gun, and those in rectangle B are those in the gun; this explanation being made to impart a better understanding of the schematic diagram.

The present welding gun, as shown in Fig. 1, includes a cylindrical metal housing 1 to which a plurality of supporting legs 2 are solidly fixed by suitable means in such manner as to extend equally beyond what will be referred to as the outer end of the housing; these legs being designed to engage with the plate or metal piece to which the stud is to be welded and to support the gun in a manner whereby the stud as applied to the holder will be held a predetermined distance away from the surface of the plate.

To afford a desired exactness in spacing of the stud and plate, each of the legs 2 is equipped at its end with an adjustable extension member comprising a bolt shank 3 that is threaded into the outer end of the leg and is designed to be held at any fixed position of extension by a lock nut 3a that is threaded on the shank and is adapted to be tightened against the end of the leg. The shank terminates in a pointed head 3b that engages the plate to which the stud is to be welded; such a plate being designated at 4 in Fig. 1.

Fixed to the upper end of the housing 1 is a handle member of conventional form, designated in its entirety by reference numeral 5; this member being hollow and formed with a central opening 6 therethrough to accommodate the fingers of the workman in gripping the handle. The handle member also is provided at one side with an opening at 7, through which a shielded cable 8 embodying the various circuit wires for control of the equipment, is extended, and from the cable, the various circuit connections with parts embodied in the gun are made, as indicated in the schematic view, Fig. 4.

Encased within the housing 1 is a solenoid coil 10 which surrounds a core, or armature bar 11 that is slidably mounted at its ends in alined bearings 12 and 13; these being formed centrally in the inner and outer end walls 14 and 15 of the housing. The lower end portion of the armature bar extends slidably through and substantially below the outer end wall of the housing, and at its end mounts the present improved stud holder thereon; this holder being designated in its entirety by reference numeral 16.

Loosely surrounding the armature bar 11, and also confined loosely within the coil 10, is a coiled spring 17, held under compression between the inner end wall 14 of the housing and an annular shoulder 19 that is formed about the body portion of the bar. This spring functions to move the bar to its outer limit of travel at which, normally, the shoulder 19 engages against the outer end wall of the housing. When the solenoid coil 10 is energized, the bar 11 will be lifted against the pressure of spring 17 and its upward travel is limited by contact of the upper end surface 11a of an enlarged body portion of the bar with the inner end wall of the housing. When the solenoid is de-energized, the spring 17 moves the bar to its outer limit of travel.

Fixed to the armature bar, above the end wall 14, is a switch bar 21 for closing circuits that are controlled by switches designated at 22 and 23; the arrangement of parts being such that the bar will be moved into contact with the switches by the downward travel of the armature bar under action of spring 17, to open both switches.

As a structural detail, the housing 1 is shown to be fixed to the handle 5 by one or more bolts 24 that extend through the handle base and are threaded into the housing end wall, as will be understood by reference to Fig. 1.

The stud holder 16, as shown in Figs. 1 and 2, comprises a cylindrical body of metal formed in its upper end with a socket 25 in which an insulating bushing 26 is fixed. The bushing, in turn, receives the lower end portion of the core bar 11 therein in such manner that the stud holder is held in coaxial alinement with the bar. Formed coaxially in the lower end of the holder is a downwardly opening elongated socket 30 which has a straight bore at its mouth slightly greater in diameter than the stud; then it tapers slightly from its open end toward its inner end. This socket is designed to receive therein the threaded end portion of the stud or bolt that is to be welded to the plate; such a stud being designated by reference numeral 32 in Fig. 1. The taper of the socket 30 is so determined that it will securely grip the end portion of the stud or bolt shank and retain it sufficiently tight for the lifting operation, but without damage to the threads of the shank. Any suitable means may be employed to insure the holding of the end of the core bar 11, in the insulated bushing that is applied to the socket 25; it being understood that the bushing electrically insulates the holder from the welding gun.

By reference more particularly to the wiring diagram shown in Fig. 4, it is to be understood that the coil 10 has one end grounded on the metallic holder 16; this being accomplished through a flexible lead 34 that extends from the coil through the end wall 15 and is then attached by a bolt 35 to the holder, as shown in Fig. 1. The other end of the coil is electrically connected by a wire 36 with one side of the contactor switch which is designated in Fig. 4 by reference numeral 40; the wire 36 leading from the gun handle through the cable 8.

A source of supply of arc initiating current is furnished through the leads designated by reference numerals 44 and 45; one of which connects in the circuit through a variable resistance designated at 50, which resistance may be adjusted to the value desired. The other wire connects to the outer contact member 51 of the switch 40 against which the switch bar may be engaged to close the circuit through the switch; it being understood that the connection 44 is grounded to the plate 4 through the variable resistance 50 and thus the circuit is completed by flow between the stud end and the plate 4 when these parts are in contact and the switch 40 is closed.

Welding current of suitable character is furnished by the lines 60 and 61; the line 61 being grounded to the plate and the line 60 being connected through a switch 62 and line 63, with the stud holder 16; this line being attached to the holder by the bolt 35.

Mounted in the handle of the gun is a control switch 65 to be closed by pressing a yieldable lever 65'. This switch has one side connected by wire 67 through a relay coil 68 with a source of A. C. current supply, which is shown in Fig. 4 as being furnished through lines 69 and 70. The other side of switch 65 is connected by wire 71 through a normally closed timer control switch 72 with the line 70 of the A. C. current supply. When the switch 65 is closed, the relay 68 is energized and this operates to close the switch 40 and thus, with the stud in contact with the plate, to close the circuit through the solenoid coil 10.

In connection with the control of the gun, we employ an arc timing device which may be of conventional type, indicated at 80, furnished with operating current through lines 81 and 82.

A current relay 84 is connected in series in the line 63 which connects the switch 62 of the welding supply circuit with the stud holder. The relay 84, when energized, closes a switch 86 connected by wires 87 and 88 with the arc timing mechanism to control its functional operations.

Fig. 4, also, indicates the contacts of switch 22 to be connected by the lines 90 and 91 with current supply lines 69 and 70.

The switch 23 has one contact connected by wire 23' with the line 90 and its other contact connected by a wire 92 with one side of a switch 93; the other side of which is connected by line 94 with the wire 91. Another switch 95 has one side connected with the wire 94 and its other side connected by wire 96 with the supply line 69. A relay 97 is connected in series in the wire 96 and this operates, when energized, to close the switch 62.

Connected in series in the line 98 is a relay 98 which, on being energized, operates to close both the switches 93 and 95.

Assuming that a stud has been applied to the holder and the gun applied to the work in the prescribed manner, as indicated in Fig. 1, which presses the head of the stud against the plate, the welding cycle would be as follows:

First, the operator closes the switch 65, thereby causing current supplied by lines 69 and 70 to flow through the relay coil 68, thus to close the switch 40 and cause welding current, supplied by lines 44 and 45, to flow through the variable resistance 50; this being adjusted to the value desired and the circuit being completed through the work plate 4, stud 32, stud holder 16 and coil 10 which is in series with the resistance 50. This flow of current energizes the coil 10 and lifts the armature bar against the holding pressure of spring 17 and moves the head of the stud an exact predetermined distance away from the plate, and thus establishes the pilot arc between the stud and plate.

With the lifting of the bar 11, switch 23 is first closed. The closing of switch 23 is followed an instant later by the closing of the switch 22. This energizes the relay coil 98 which closes switches 95 and 93; and switch 95 energizes relay coil 97, causing welding current supplied by lines 60 and 61 to flow to the stud and the welding arc to be initiated by aid of the pilot arc which has been established. Switch 93 operates as a "hold in" switch, keeping current on the relay coil 98 after switch 22 opens, and until switch 23 is opened. The welding arc which is rooted on the stud head and on the plate directly below the head, causes melting of the parts, thus forming a pool of molten metal in the plate, the extent of which is determined by the character of the arc and its duration.

When this welding arc current flows, the relay 84 is energized, thus closing the switch 86 and starting the time mechanism, which after a predetermined time interval, operates to open the switch 72, thus de-energizing the relay 68 and causing switch 40 to open. Opening of the switch 40 cuts the welding current flow and de-energizes the coil 10 and the spring 17 then acts to move the solenoid outwardly and to force the stud head into the pool of molten metal that has been formed incident to the flow of the welding arc. When the armature 11 moves outward, this opens the switches 22 and 23, de-energizes the relays 97 and 98, resulting in the opening of the switch 62 and the return of the parts to starting position, with the stud welded in place on the plate; thus completing the cycle of operations.

One of the most important features of this operation is the establishing of the pilot arc that makes possible the initiating of the welding arc without any incident short circulating and inrush of current that would cause sticking of the stud. As a result of this, the gun may be made lighter and the many advantages of using a light gun are enjoyed.

Having thus described my invention, what I claim as new therein and desire to secure by Letters Patent is:

1. In apparatus for arc welding a stud, forming one electrode of a welding circuit, to a plate forming the other electrode of the circuit; a stud holder, yielding means acting thereagainst to press the stud against the plate, an electrically energizable means for moving the stud holding means to retain the stud lifted from the plate while said means is energized, a normally open circuit for an arc initiating current including the plate, the stud and said electrically energizable means therein, a normally open circuit for a welding current including the stud and the plate therein, means for closing the first mentioned circuit to effect energization of the said electrically energizable means and the lifting of the stud from the plate to initiate an arc between the electrodes, and means, operable incident to the stud lifting movement of the holder, to close the welding circuit.

2. An apparatus as recited in claim 1 including an automatic means for timing the duration of flow of the arc initiating current, and means operable incident to opening of this circuit by the timer and de-energization of the stud lifting means to open the welding circuit.

3. An apparatus as recited in claim 1 including an automatic means for timing the duration of flow of the arc initiating current, means operable incident to the opening of the circuit for the arc initiating current by the said automatic means and the de-energization of the stud lifting means to open the circuit for the welding current, and means actuated by flow of welding current to actuate the automatic timing means.

4. In apparatus for arc welding a stud, forming one electrode of a welding circuit, to a plate forming the other electrode of the circuit, a movable holder for the stud, yieldable means acting against the holder to urge the stud as held thereby against the plate, a solenoid operable when energized to lift the holder against pressure of the said yieldable means to space said stud a definite arcing interval from the plate, a normally open circuit for an arc initiating current including the said solenoid, the stud and plate therein, a normally opening circuit for a welding current including the stud and plate therein, manually operable means for causing closing of the first mentioned circuit to cause lifting of the stud and the initiation of an arc between the electrodes, means operable incident to the stud lifting movement of the holder to close the welding circuit, an automatic timer that becomes activated incident to flow of welding current between the electrodes and which determines the time interval of flow of current in the first mentioned circuit with de-energization of the solenoid, and an incident actuation of the stud holder by the said yieldable means to apply the stud to the plate, and means controlled by this stud seating movement of the holder to open the welding circuit.

5. An apparatus as recited in claim 4 wherein means is provided whereby to delay the opening of the welding circuit until immediately after the stud has been seated.

6. In apparatus for arc welding a stud, forming one electrode of a welding circuit to a plate forming the other electrode of the circuit, a stud holder, yieldable means acting against the holder for pressing a stud held thereby against the plate, an electrically energizable means for lifting the holder to space the stud a predetermined distance from the plate, a normally open circuit for an arc initiating current including the stud, the plate and said electrically energizable means therein, a normally open circuit for welding current, including the stud and the plate therein, a manually operable switch for causing the closing of the first mentioned circuit to cause the lifting of the stud and the initiation of the pilot arc between the electrodes, a pair of switches arranged to be closed and opened in timed sequence with the lifting and with the lowering actions of the stud holder, a third electric circuit including the last closed and first opened of said switches therein, a second pair of switches, a relay in said third circuit operable upon being energized, to close the second pair of switches, a relay for closing of the circuit for welding current, a circuit for the last mentioned relay connected to receive current from said third circuit through one of said second pair of switches, and circuit connections from said third circuit through the other of said second pairs of switches, and through the last opened of the pair of switches first mentioned, and automatic timer means for determining the interval of flow of arc initiating current.

7. An apparatus as recited in claim 6 wherein the circuit for the arc initiating current has a control switch therein and said manually operable switch controls a fourth circuit including a relay therein for closing the said control switch.

8. An apparatus as recited in claim 6 wherein the circuit for the arc initiating current has a relay controlled switch therein and a normally closed timer actuated switch, and said manually operable switch controls a fourth electric circuit including said relay which is operable to close and open the said control switch upon being energized and de-energized.

9. An apparatus as recited in claim 6 wherein the circuit for the arc initiating current has a relay controlled switch therein and a normally closed timer actuated switch, and said manually operable switch controls a fourth electric circuit including said relay which is operable to close and open the said control switch upon being energized and de-energized, and wherein said automatic timer means becomes activated incident to closing the circuit for welding current and operates to open said timer actuated switch in the fourth electric circuit at the end of a designated time interval.

10. A stud holder for arc welding guns of the character described, comprising a body member formed with an elongated and slightly tapered socket adapted to receive the end portion of a stud therein in a wedging fit whereby the stud will be held without damage thereto in a stud welding operation.

11. A stud holder for arc welding guns of the character described comprising a metal body member equipped for fixed mounting on a stud lifting member, and having an elongated and slightly tapered socket therein adapted to receive and coaxially retain the end portion of a stud therein in a wedging fit whereby the stud will be held without damage thereto in a stud welding operation.

12. A stud holder for arc welding guns of the character described, comprising a metal body member formed at one end with a socket for the reception, and for the securement therein of a stud lifting plunger, and having a socket formed in the other end thereof for mounting a stud; said last named socket being cylindrically formed at its mouth, then continuing in an elongated and slightly tapered bore for the reception and holding of the end portion of a stud without damage thereto for a welding operation.

13. In an arc welding gun having a plunger that is operable to lift a stud from and apply it against a plate, a stud holder comprising a metal body formed at one end with an axial socket, an insulating bushing fitted in the socket and receiving said plunger therein to functionally mount the holder; and formed at its other end with an axial socket having a cylindrically bored mouth leading into an elongated taper to receive the end portion of a stud therein in a wedging fit and in good circuit contact without damage to the stud, and means on the body for the attachment of circuit wires thereto.

14. The method of welding a stud to a plate using a gun characterized by having a stud holder and means for moving the holder to lift the stud from the plate for a timed interval, then applying it against the plate; comprising applying an arc initiating current on a circuit including the stud and plate while they are in contact, then lifting the stud to initiate a pilot arc between the plate and stud, then applying a welding current to a circuit including the stud and plate therein, opening the arc initiating circuit, immediately bringing the stud and plate into contact, and then opening the welding circuit.

GROVER A. HUGHES.